Figures 1, 13:
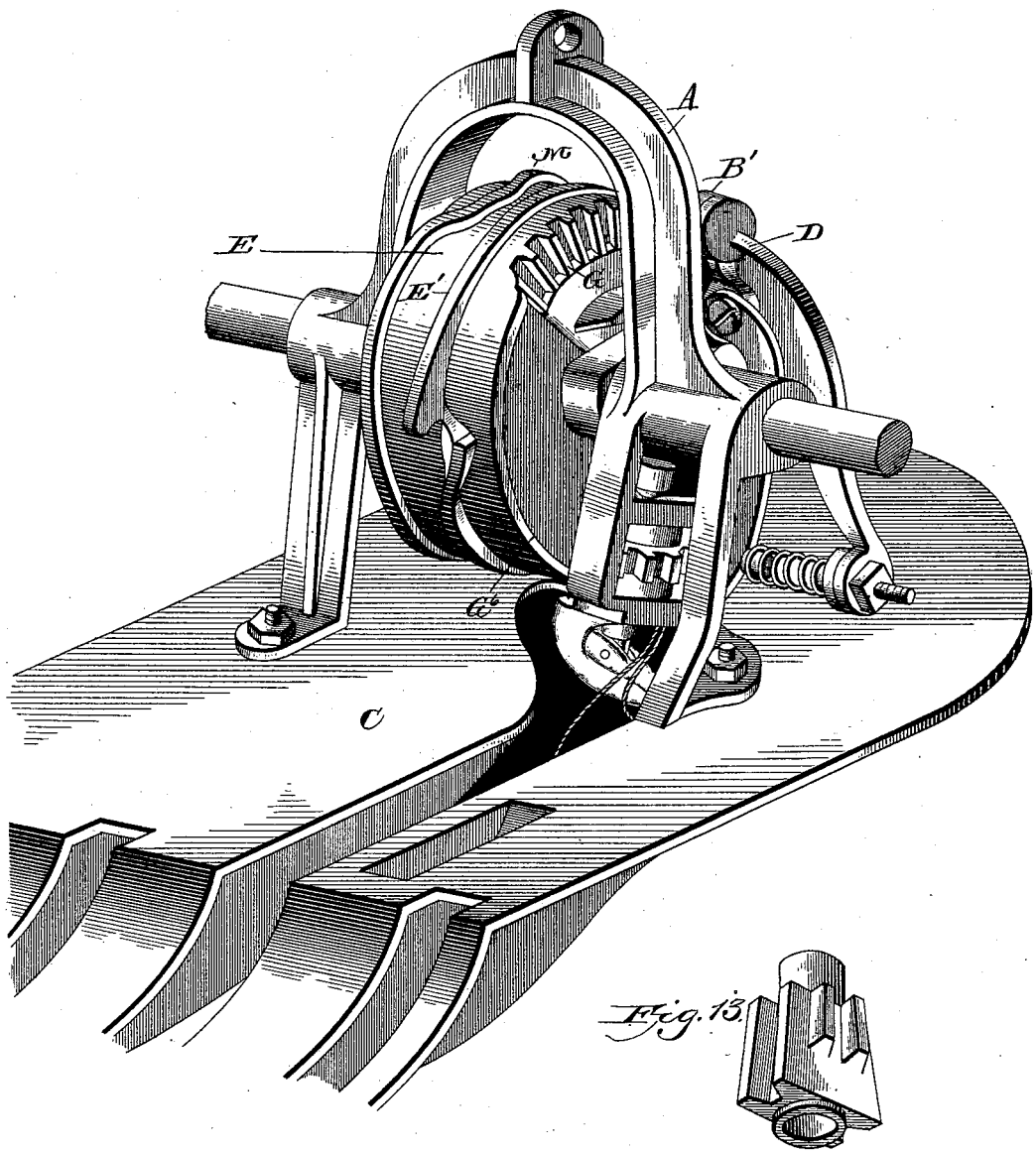

(No Model.) 7 Sheets—Sheet 1.
M. L. NICHOLS.
KNOT TYING MECHANISM.

No. 453,267. Patented June 2, 1891.

WITNESSES
F. L. Ourand
John Enders Jr.

INVENTOR
Marion L. Nichols
by Alex Mahon
Attorney (No Model.) 7 Sheets—Sheet 2.
M. L. NICHOLS.
KNOT TYING MECHANISM.

No. 453,267. Patented June 2, 1891.

WITNESSES
F. L. Ourand
John Enders Jr.

INVENTOR
Marion L. Nichols
by Alex Mahon
Attorney (No Model.)  M. L. NICHOLS.  7 Sheets—Sheet 3.
KNOT TYING MECHANISM.
No. 453,267. Patented June 2, 1891.
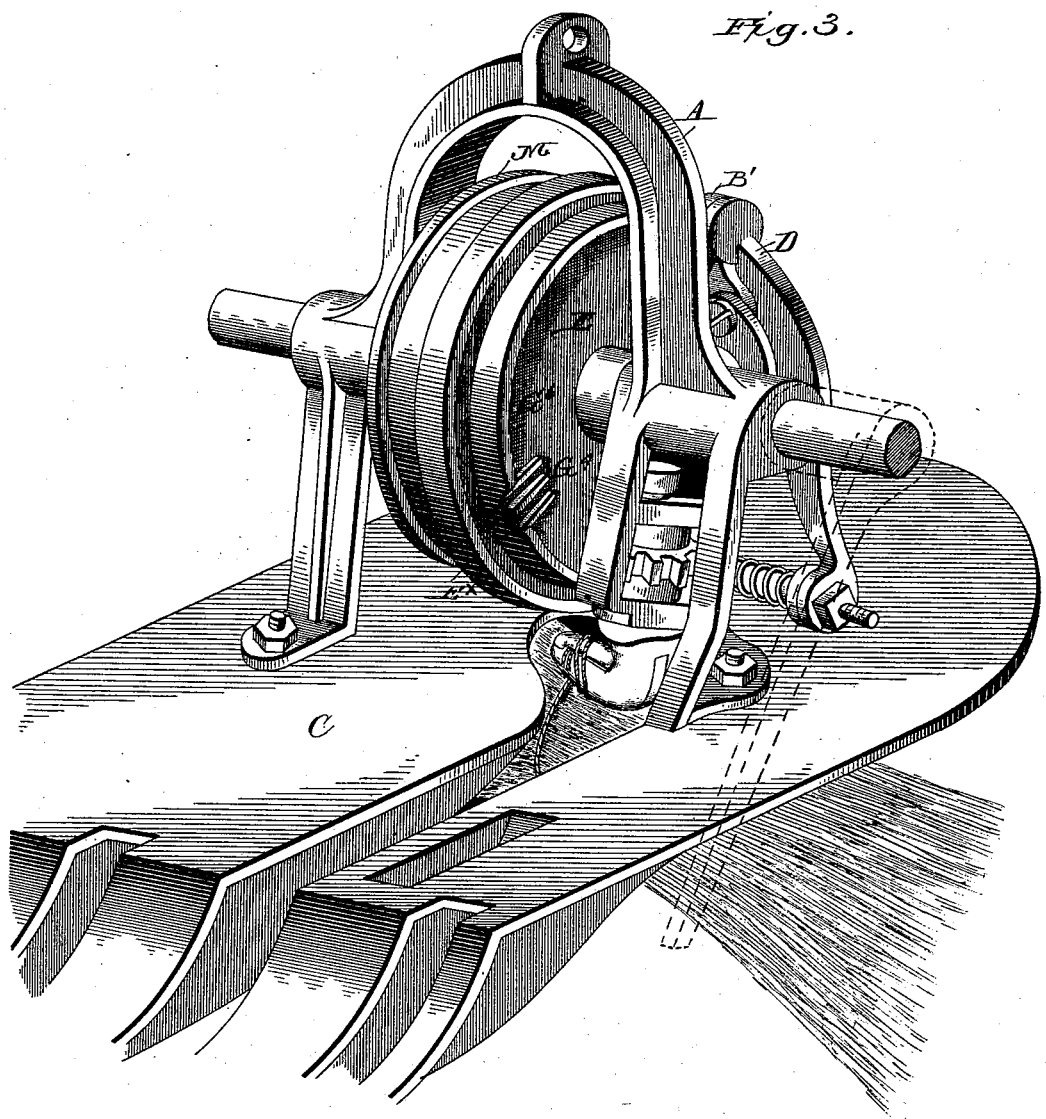

(No Model.) 7 Sheets—Sheet 4.

M. L. NICHOLS.
KNOT TYING MECHANISM.

No. 453,267. Patented June 2, 1891.

WITNESSES
F. L. Durand
John Enders Jr.

INVENTOR
Marin L. Nichols
by Alex Mahon
Attorney (No Model.) 7 Sheets—Sheet 5.
M. L. NICHOLS.
KNOT TYING MECHANISM.

No. 453,267. Patented June 2, 1891.

WITNESSES
F. L. Ourand
John Enders Jr.

INVENTOR
Marion L. Nichols
by Alex Mahn
Attorney.

(No Model.) 7 Sheets—Sheet 6.

M. L. NICHOLS.
KNOT TYING MECHANISM.

No. 453,267. Patented June 2, 1891.

WITNESSES
F. L. Ourand
John Enders Jr.

INVENTOR
Marin L. Nichols
by Alex Mahon
Attorney (No Model.) 7 Sheets—Sheet 7.

M. L. NICHOLS.
KNOT TYING MECHANISM.

No. 453,267. Patented June 2, 1891.

WITNESSES
F. L. Durand
John Enders Jr.

INVENTOR
Marion L. Nichols
by Alex Mahon
Attorney

UNITED STATES PATENT OFFICE.

MARION L. NICHOLS, OF NEW YORK, N. Y., ASSIGNOR TO THE NICHOLS HARVESTER COMPANY, OF SAME PLACE.

KNOT-TYING MECHANISM.

SPECIFICATION forming part of Letters Patent No. 453,267, dated June 2, 1891.

Application filed January 5, 1891. Serial No. 376,685. (No model.)

*To all whom it may concern:*

Be it known that I, MARION L. NICHOLS, of New York, county of New York, State of New York, have invented new and useful Improvements in Knot-Tying Mechanism for Grain-Binders, of which the following is a full and exact description, reference being had to the accompanying drawings, making part of this specification.
My invention relates particularly to that form of knotter in which the pivoted jaw is operated positively in both directions by the cam and gear wheel, as described and claimed in Letters Patent granted to me, dated April 10, 1888, No. 381,079, and in which the gripper-frame is swung bodily to and from the knotter.

My invention consists, first, in a novel construction and arrangement of parts, wherein a swinging gripper-frame carrying a knife is employed with a gripper-disk combined with a knotter-operating wheel provided with cam or track ways for imparting a swinging movement to the gripper-frame and a direct reciprocating movement to the knife.

It further consists in providing the knotter-operating wheel with teeth and delay-surfaces and the knotter-operating pinion with teeth and delay-surfaces to be engaged alternately by the teeth and delay-surfaces of the knotter-operating wheel, whereby one full revolution is imparted to the knotter to form the loop to a point of rest, while the knife is impelled to cut the twine, then one-half revolution to strip the knot, and a continued further half-revolution to return the knotter to its position of rest to repeat the operation, all as hereinafter described.

Figures 2, 10:
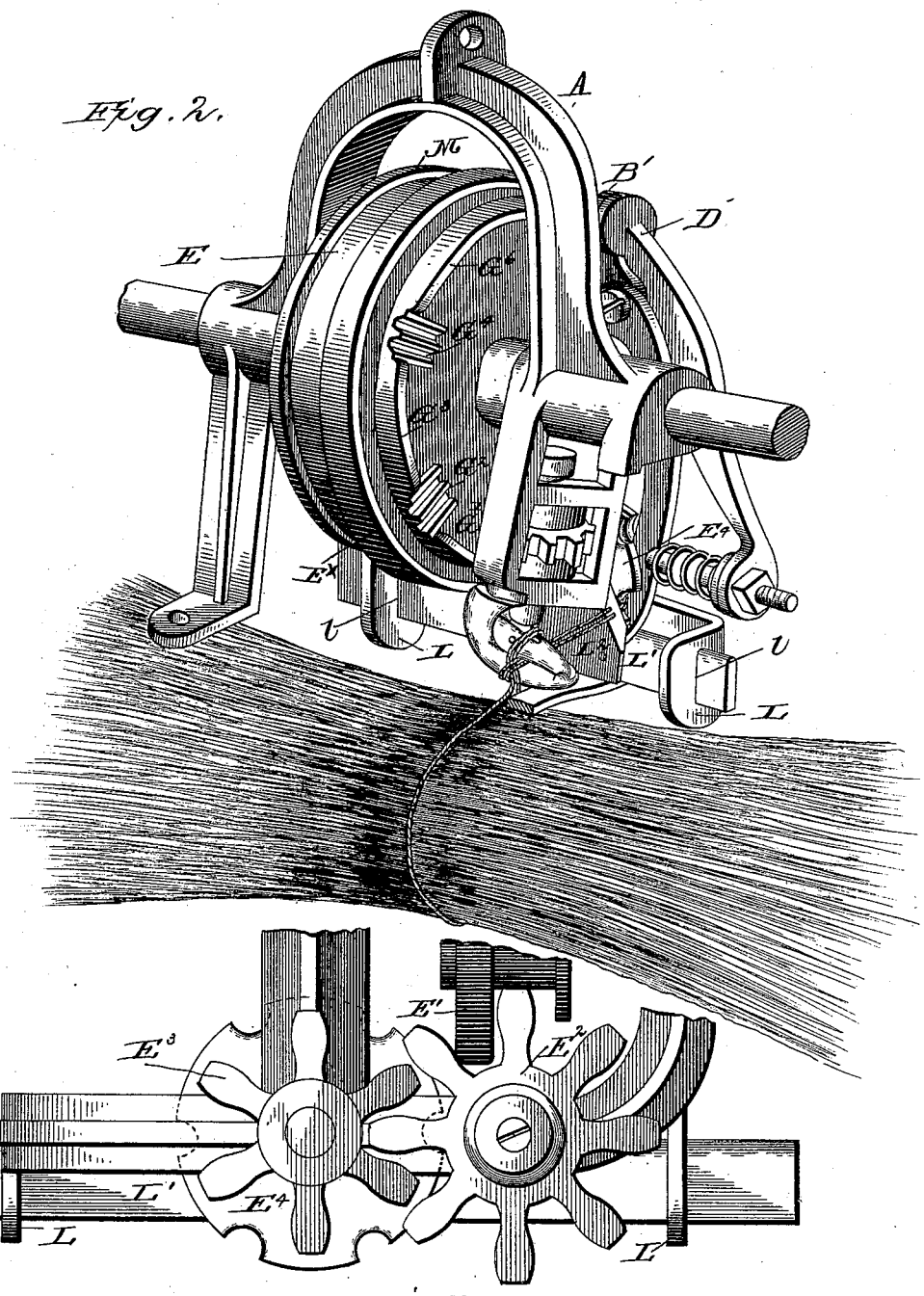
Figure 4:
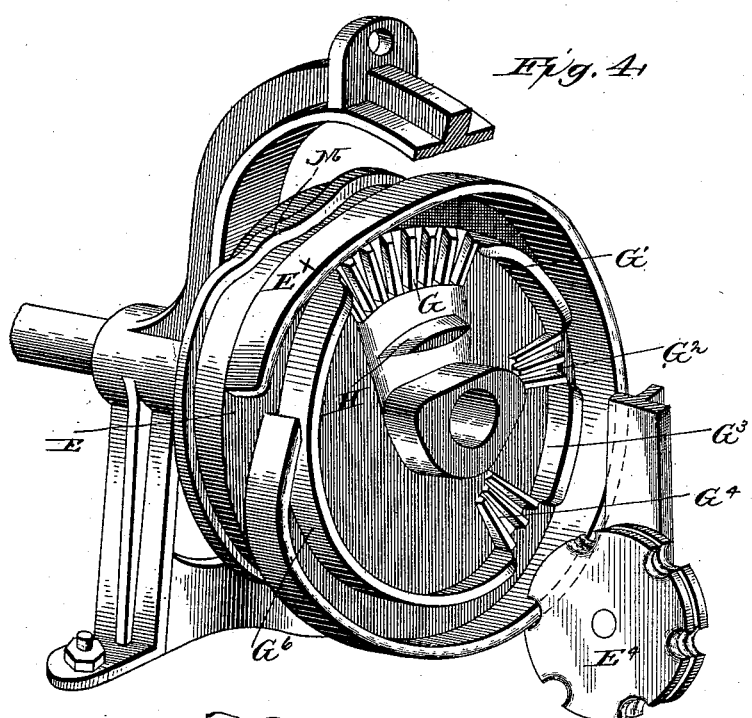
Figure 12:
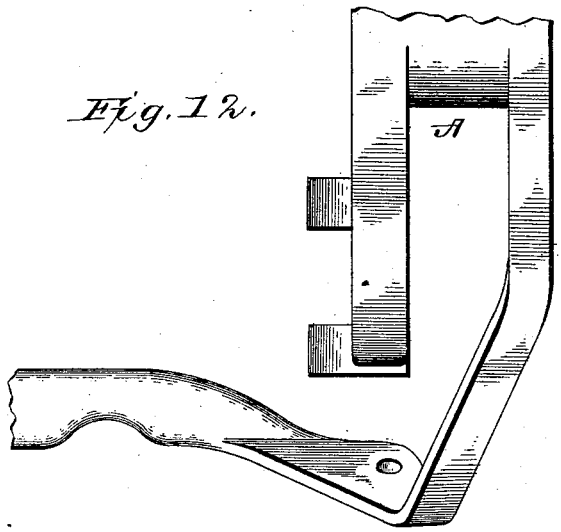
Figure 11:
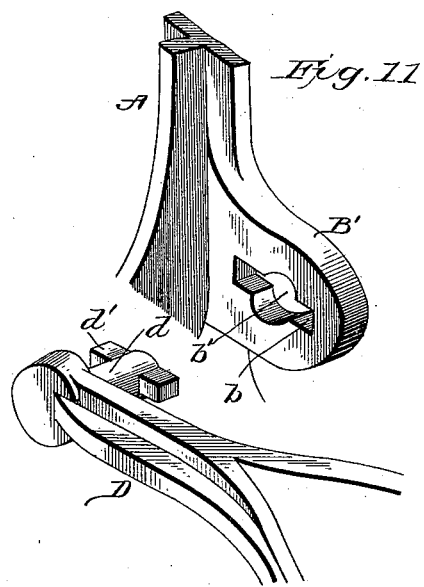
Figure 5:
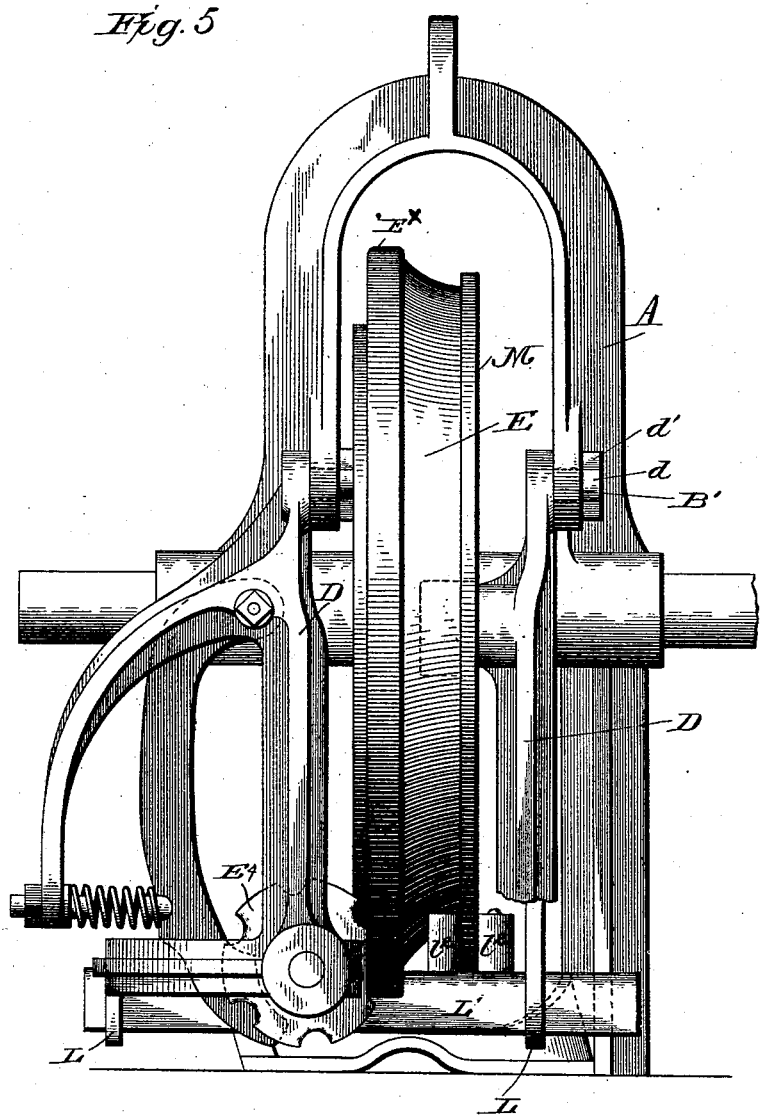
Figure 6:
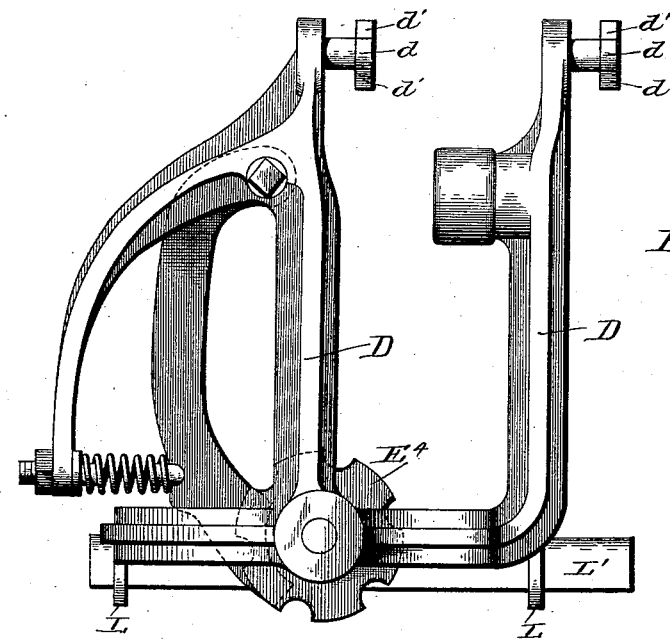
Figure 7:
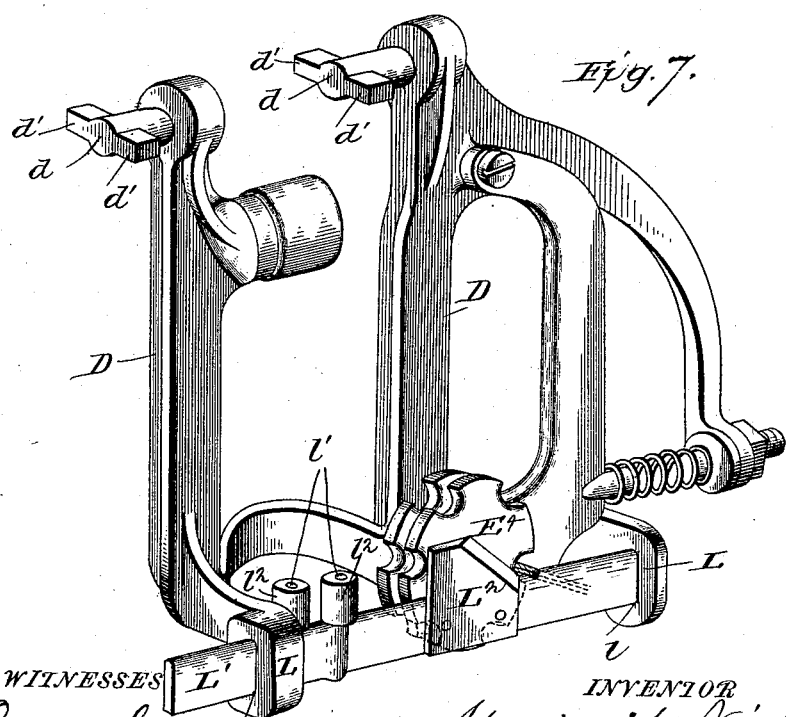
Figure 8:
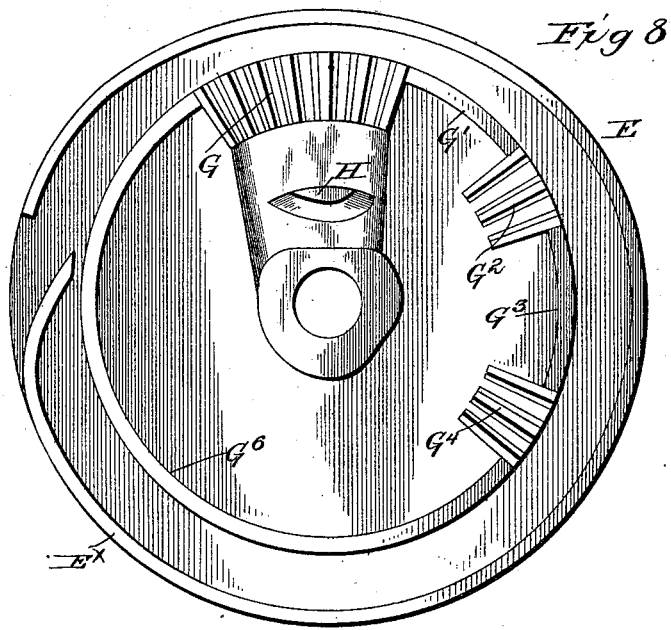
Figure 9:
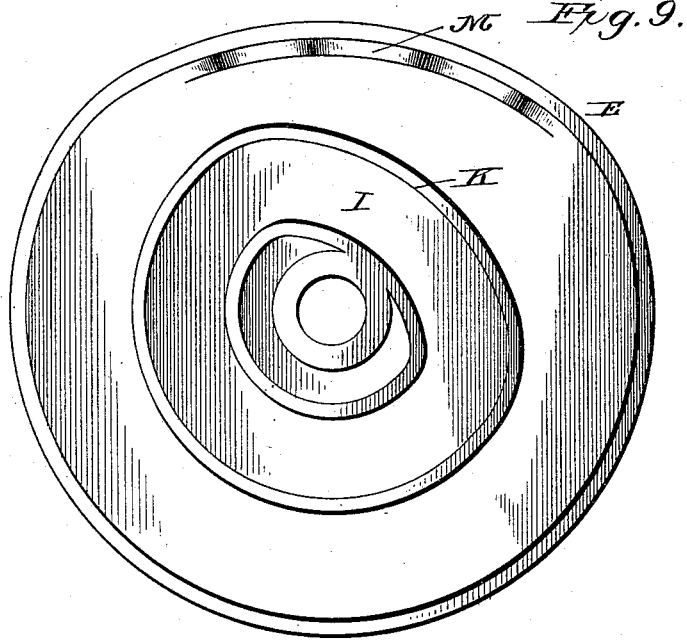

In the accompanying drawings, Figure 1 is a perspective view of a portion of a knotting-mechanism frame, showing the cam and gear wheel and the knotter, also a portion of the gripper-frame and breast-plate with the knotter in its position of rest, illustrating the form of cam and gear wheel in which the same communicates the rotation to the gripper-wheel through an intermediate pinion. Fig. 2 is a similar view showing the knotter and cord thereon with the knotter in position to cut the cord after having made one full revolution and in which case the cam and gear wheel is shown with the cam or track for imparting the rotation directly to the gripper-disk formed on the face instead of the periphery. Fig. 3 is a similar view with the knotter moved a revolution and a half and in position to strip the knot. Fig. 4 is a perspective view of the cam and gear wheel with a portion of the frame broken away to show the gears and cams and delay-surfaces for revolving and holding the knotter in its different positions of rest and opening and closing the pivoted jaw, showing the gripper-disk and cam for imparting rotation to the same, and also showing the cam on the periphery of the wheel for reciprocating the knife. Fig. 5 is a rear view of the knotter-mechanism frames, showing the gripper and operating-arm and gear-wheel. Fig. 6 is a rear view of the swinging gripper-frame. Fig. 7 is a perspective view, taken from the opposite side, showing the reciprocating knife. Fig. 8 is a rear face view of the cam and gear wheel. Fig. 9 is a view of the opposite side, showing the cam for controlling the yielding or swinging movement of the gripper-frame; also a side view of the irregular portion of the cam which reciprocates the knife. Fig. 10 is a rear view of a portion of the cam and gear wheel and the gripper-frame, showing the gripper operated through an intermediate gear-wheel or pinion. Fig. 11 is a perspective view of a portion of the knotter-frame with the bearing-lug formed integral therewith for receiving one of the pivot-arms of the swinging gripper-frame; and Fig. 12 is a view of a fixed twine-guide formed integral with the knotter-frame for preventing the twine from escaping from the bill during the time the packers are in action. Fig. 13 is a perspective view showing the pinion that revolves the knotter-shaft.

The frame A, in which the knotter cam and gear wheel E is mounted, is similar to that described in the patent before referred to, and also the breast-plate C, and said parts need not be herein particularly described.

Extending from the rear face of the knotter-frame are lugs or ears B', in which are formed elongated slots $b$, having the central portion $b'$ made in circular form, and the arms D of the gripper-frame are provided with outwardly-projecting pivots $d$, having formed on their outer ends a head-piece $d'$, conforming in shape to the shape of the elongated slot $b$ in the lugs or ears B', the central portion forming the bearing for the pivots of the gripper-frame and by means of which serving to permit the said frame to be readily connected to the knotter-frame without the use of special fastening devices.

The knotter cam and gear wheel E, as shown in Fig. 1, has the cam for operating the gripper formed on the periphery of the wheel, and consists of the rib E', extending around the same, with one of its ends curved inward toward the knotter-shaft to form a raised trackway to engage the teeth of the pinion $E^2$, which communicates motion to the pinion $E^3$, connected to the gripper-disk $E^4$, to impart thereto sufficient movement at each revolution of the wheel to grip the twine.

The cam or track way is shown at $E^x$ in Figs. 2, 3, 4, 5 and 8 as formed on the side face of the cam and gear wheel, and the construction of the parts in said figures is especially adapted to such location, in which case the trackway may engage directly with the notches of the gripper-disk.

The side face of the cam and gear is provided with teeth and delay-surfaces to impart two complete revolutions in the same direction to the knotter-shaft to form the loop, strip the knot, and return the knotter to its normal position, the position of rest being illustrated in Figs. 1 and 4, the side face being divided up into the teeth and delay-surfaces in the following manner: Teeth G, sufficient in number to impart a complete revolution to the knotter-shaft, are arranged in line with the cam H, which opens the jaw, which teeth in imparting said complete revolution wrap the twine around the knotter-bill, the cam acting to open the jaw and seize the end of the twine held by the gripper. Extending from the end of this gear is a delay-surface G', which holds the knotter in a position of rest while the twine is being cut, and next to this delay-surface are formed teeth $G^2$, of a sufficient number to impart a half-revolution to the knotter to bring the same into position to strip the knot, when another delay-surface is formed, as shown at $G^3$, to hold the knotter in a position of rest as the knot is being stripped, and then a similar number of teeth $G^4$, as before, to impart another half-revolution to the knotter to return the same to its position of rest, the remaining position between the last-referred-to teeth and those first referred to forming a long delay-surface $G^6$ for holding the knotter in a position of rest after the cam and gear wheel is thrown into action and while the needle is being carried around the bundle and the twine carried by the needle is being gripped, the raised track for operating the gripper being arranged in such position on the cam and gear wheel in advance of the teeth, by which a full revolution is imparted to the knotter, as to engage either the gear of the gripper or gripper-disk to grip the cord just before the gear commences to revolve the knotter.

To provide for the swinging movement of the gripper-frame to and from the knotter to take sufficient twine to give slack to the same when the knotter is forming the loop, the cam or gear wheel on the opposite side to the knotter is provided with a trackway I, which for a portion of its distance is formed concentric with the driving-shaft and for a portion being flattened, as shown at K, in or through which trackway a friction-roller, mounted on a stud-axle formed with one of the arms of the gripper-frame, moves the concentric portion of the track, acting to throw the gripper-frame away from the knotter, while the flattened portion acts to draw or permit the frame to move toward it. The cam or track for actuating or rotating the gripper has a similar configuration for allowing the swinging of the frame relative to this track. By this construction and arrangement of parts it will be seen that while the gripper is operated directly from the knotter-operating wheel without the intervention of the ordinary form of pawl and ratchet at the same time the swinging of the gripper-frame to and from the knotter to give slack is provided for.

Extending in from the lower ends of the arms of the gripper-frame are bearing-lugs L, in which are formed elongated slots $l$, in which is mounted a reciprocating knife-bar L', carrying the knife $L^2$. Near one end of this bar are formed two upright lugs $l'$, on which are mounted friction-rollers $l^2$, and the cam and gear wheel is provided on its peripheral face with a trackway which is adapted to move between the friction-rollers, and which cam or trackway is made in wave form, as shown at M, which portion acts to reciprocate the knife to sever the twine. This cam or track is also made in a similar form to those for driving and controlling the gripper and for a similar purpose. It will thus be seen that the knife is also carried by the gripper-frame, by which means the knife can be arranged at any desired point or distance between the gripper and the knotter.

The cam for operating the gripper by the direct engagement thereof with the notches in the gripper is shown, as before stated, in Figs. 2, 3, 4, 5, and 8, with the cam extending from the side face of the gear-wheel; but the action of the device is the same in both cases.

In Fig. 12 is shown a twine-guide, preferably formed integral with the knotter-frame and arranged in substantial relation to the knotter, so as to guide and hold the twine on the knotter-bill at all times positively, and especially while the packers are forcing the grain against the twine, where the greatest liability exists for the twine to escape from the bill.

Having now described my invention, what I claim as new, and desire to secure by Letters Patent, is—

1. In a knotting mechanism for grain-binders, a swinging gripper-frame carrying the knife and the gripper-disk, and a knotter-operating wheel provided with cam or track ways for imparting a swinging movement to the gripper-frame and a direct reciprocating movement to the knife, substantially as set forth.

2. In a knotting mechanism for grain-binders, a knotter-operating wheel provided with teeth and delay-surfaces, the knotter-operating pinion provided also with teeth and delay-surfaces to be engaged alternately by the teeth and delay-surfaces of the knotter-operating wheel, and arranged substantially as described, whereby one full revolution is imparted to the knotter to form the loop, then stopped while the twine is cut, then one-half revolution to discharge the knot, and a continued further half-revolution to return the knotter to its position of rest, as set forth.

In testimony whereof I have hereunto set my hand this 11th day of November, A. D. 1890.

MARION L. NICHOLS.

Witnesses:
ALEX. MAHON,
S. M. HOWARD.